US008676521B2

(12) United States Patent
Vennelakanti et al.

(10) Patent No.: US 8,676,521 B2
(45) Date of Patent: Mar. 18, 2014

(54) SYSTEM AND METHOD FOR HANDLING WIDE DYNAMIC RANGE SIGNALS ENCOUNTERED IN VIBRATION ANALYSIS USING A LOGARITHMIC AMPLIFIER

(75) Inventors: V.s.s Kumar Vennelakanti, Prakasam (IN); Ramesh Babu Srinivasa, Mysore (IN)

(73) Assignee: Fluke Corporation, Evertt, WA (US)

( * ) Notice: Subject to any disclaimer, the term of this patent is extended or adjusted under 35 U.S.C. 154(b) by 375 days.

(21) Appl. No.: 12/911,452

(22) Filed: Oct. 25, 2010

(65) Prior Publication Data

US 2011/0098949 A1    Apr. 28, 2011

(30) Foreign Application Priority Data

Oct. 26, 2009 (IN) ............................. 2593/CHE/2009

(51) Int. Cl.
*G01F 17/00* (2006.01)

(52) U.S. Cl.
USPC .......................................................... 702/56

(58) Field of Classification Search
USPC .......................................................... 702/56
See application file for complete search history.

(56) References Cited

U.S. PATENT DOCUMENTS

| 4,124,773 A | * | 11/1978 | Elkins ...................... 379/101.01 |
| 4,528,852 A | * | 7/1985 | Sohoel ............................... 73/593 |
| 4,884,265 A | * | 11/1989 | Schroeder et al. ............ 370/484 |
| 6,889,553 B2 | | 5/2005 | Robinson et al. |

OTHER PUBLICATIONS

Weinstein, Data Transmission by Frequency-Division Multiplexing Using the Discrete Fourier Transform, 1971, IEEE.*

* cited by examiner

*Primary Examiner* — Stephen Cherry
(74) *Attorney, Agent, or Firm* — Christensen O'Connor Johnson Kindness

(57) ABSTRACT

A data acquisition system for vibration analysis signals includes a logarithmic amplifier for compressing wide dynamic range signals. The logarithmic amplifier replaces attenuators, gain amplifiers, and gain switches used in a conventional system. Further, only a low bit-count analog to digital converter is needed in combination with the logarithmic amplifier. Consequently, the footprint of the system and system cost are reduced.

19 Claims, 2 Drawing Sheets

SYSTEM AND METHOD FOR HANDLING WIDE DYNAMIC RANGE SIGNALS ENCOUNTERED IN VIBRATION ANALYSIS USING A LOGARITHMIC AMPLIFIER

CROSS-REFERENCE TO RELATED APPLICATIONS

This application claims the benefit of the following application which is incorporated by reference in its entirety, Indian Provisional Application No. 2593/CHE/2009, entitled "SYSTEM AND METHOD FOR HANDLING WIDE DYNAMIC RANGE SIGNALS ENCOUNTERED IN VIBRATION ANALYSIS USING A LOGARITHMIC AMPLIFIER", filed Oct. 26, 2009.

TECHNICAL FIELD

The present disclosure relates to measurement of signals having a wide dynamic range that are encountered in vibration analysis.

BACKGROUND

Vibration analyzers are often used to monitor machinery and to perform predictive machinery maintenance. Machinery vibrations can be monitored by using a sensor such as an accelerometer, velocity sensor, or displacement sensor to measure the vibrations to be analyzed. The vibration signals to be measured often span a wide dynamic range, even upwards of 100 dB. A vibration analyzer instrument that cannot handle such a large dynamic range may have user settings for input range and gain amplification. However, problems from inaccurate user settings may arise. For example, if the input range is set to be too large, the instrument may not be able to measure small signals, and if the input range is set to be too small, the instrument may become overloaded with large input signals.

SUMMARY

A data acquisition system for vibration analysis signals may include a logarithmic amplifier for compressing wide dynamic range signals. The logarithmic amplifier may replace attenuators, gain amplifiers, and/or gain switches required in a conventional system. Further, a lower resolution analog to digital converter may be used in combination with the logarithmic amplifier. Consequently, the footprint of the system, power requirements, and system cost may be reduced.

BRIEF DESCRIPTION OF THE DRAWINGS

Examples of a logarithmic amplifier that may be used for handling wide dynamic range signals for vibration analysis are illustrated in the figures. The examples and figures are illustrative rather than limiting.

DETAILED DESCRIPTION

Vibration analyzers sense signals from a vibration sensor, such as an accelerometer, velocity sensor, or displacement sensor. The peak-to-peak signals generated by an accelerometer can range from the micro-volt level for machines having very low rotations per minute (RPM) up to tens of volts for rapidly rotating machines.

Figure 1:
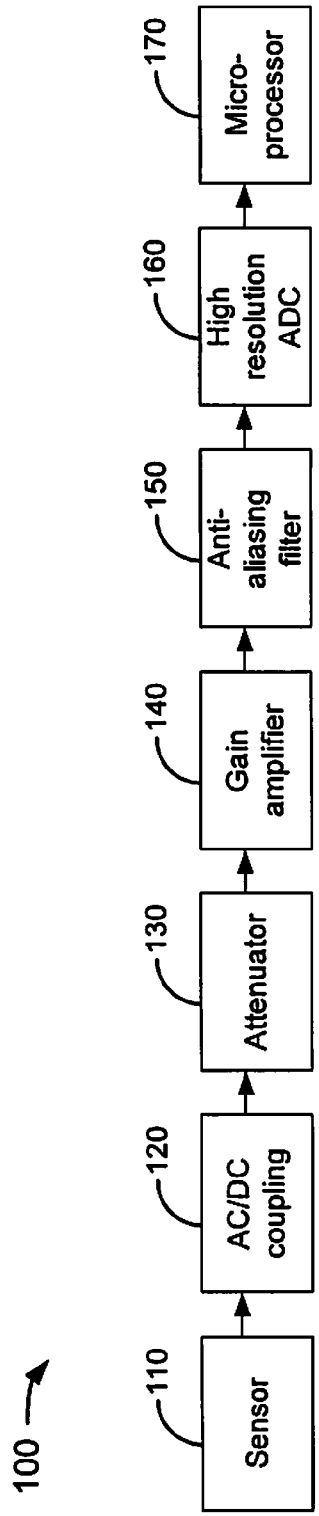
FIG. 1 is a block diagram illustrating an example of a system that handles wide dynamic range signals without using a logarithmic amplifier.

FIG. 1 is a block diagram illustrating an example of a conventional vibration analysis system 100. The system 100 includes a sensor 110, an AC/DC coupling 120, one or more attenuators 130, one or more gain amplifier stages 140, an anti-aliasing filter 150, a high resolution analog to digital converter (ADC) 160, and a microprocessor 170.

The sensor 110 senses vibrations for vibration monitoring and analysis. A power source (not shown) may be coupled to the sensor to provide power to the sensor. The sensor 110 sends its output to the AC/DC coupling 120 that couples alternating current (AC) and/or direct current (DC) voltage signals. Typically, an accelerometer signal will have an AC component in addition to a DC bias component.

From the AC/DC coupling 120, a signal is sent to one or more attenuators 130 and/or one or more gain amplifier 140 stages, depending upon the strength of the signal. The output of the gain amplifier 140 is sent through an anti-aliasing filter 150 that removes out-of-band signals from the amplified signal. Then, the filtered signal enters the high resolution ADC 160 to be digitized. Signals that are removed by the anti-aliasing filter 150 are at frequencies that are above the operating range of the high resolution ADC 160. Finally, the digitized signal is processed further by the microprocessor 170.

The resolution requirement of the ADC 160 in the conventional system 100 is calculated here for comparison below with the resolution requirement of an ADC in a system that uses a logarithmic amplifier. For example, if the minimum signal amplitude to be measured is 10 $\mu V_{pp}$, and the maximum signal amplitude to be measured is 20 $V_{pp}$, where $V_{pp}$ is the peak-to-peak voltage, then the dynamic range to be measured by the system 100 may be given by $20^*\log_{10}(20 V_{pp}/10 \mu V_{pp})$ which equals 136 dB. The number of bits N required for the ADC 160 to measure a signal having a 136 dB dynamic range may be calculated using equation (1) below as follows:

$$20^*\log_{10}(2^N) = 136 \text{ dB}. \tag{1}$$

In this example, N equals 22.59 which rounds up to 23 bits. Thus, the minimum number of bits N required for the ADC 160 to measure a signal having a 136 dB dynamic range is approximately 23 bits. Further, to ensure that the 23 bits from the ADC 160 are noise-free, it may be desirable to use at least a 28-bit ADC which is conventionally considered to be a very high resolution ADC.

Figure 2:
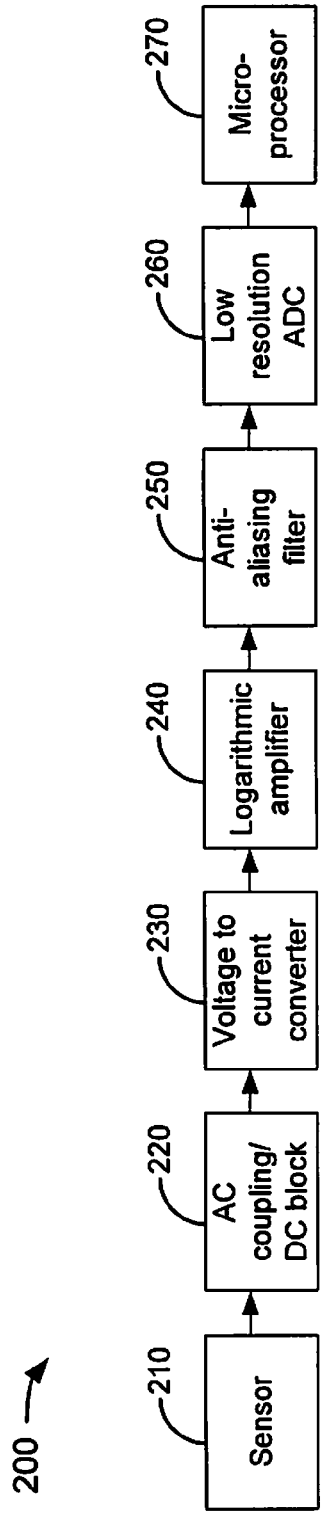
FIG. 2 is a block diagram illustrating an example of a system that handles wide dynamic range signals using a logarithmic amplifier, according to an embodiment of the disclosure.

In contrast, FIG. 2 is a block diagram illustrating an example of a system 200 according to an embodiment of the disclosure that handles large dynamic range signals using a logarithmic amplifier. The system 200 includes a sensor 210, an AC coupling/DC block 220, a voltage to current converter 230, a logarithmic amplifier 240, an anti-aliasing filter 250, a low resolution ADC 260, and a microprocessor 270.

Similar to the sensor 110 of system 100, the sensor 210 also senses vibrations and may require a power source. The output from sensor 210 is sent to the AC coupling/DC block 220 that removes any DC bias voltage that may be present in the output from the sensor 210 while transmitting an AC voltage component. The AC voltage component is then converted into an AC current signal by the voltage to current converter 230. Conversion to the AC current signal improves the accuracy of the logarithmic amplifier 240.

The output of a logarithmic amplifier is k times the logarithm of the input current, as shown in equation (2) below:

$$V_{out}=k*log_{10}(I_{in}/I_{ref}).\qquad(2)$$

where k is a scaling factor, $I_{in}$ is the input current signal, and $I_{ref}$ is a normalization constant. Thus, the logarithmic amplifier 240 may logarithmically compress the input current signal such that high dynamic range signals input to the logarithmic amplifier 240 are transformed into low dynamic range output signals. For example, input signals having greater than an approximately 80 dB dynamic range can be transformed by the logarithmic amplifier 240 into output signals having less than an approximately 20 dB dynamic range.

The logarithmically compressed output signal is sent to an anti-aliasing filter 250 that removes any out-of-band signals. Then the signal filtered by the anti-aliasing filter 250 is sent to a low-resolution ADC 260 to be digitized. In one embodiment, the anti-aliasing filter 250 is a low-pass filter that does not pass frequencies above the range of operation of the ADC 260.

The resolution requirement of the ADC 260 in the system 200 that uses the logarithmic amplifier 240 to compress the input current signal can be contrasted with that of the ADC 160 used in the conventional system 100. Using the same signal ranges as used for the resolution requirement of the ADC 160 above, where the minimum signal amplitude to be measured is approximately 10 $\mu V_{pp}$ and the maximum signal amplitude to be measured is approximately 20 $V_{pp}$, and further using a scaling factor k equal to 1, a normalization constant $I_{ref}$ equal to 1 nA, and input currents calculated with respect to a resistance of 800Ω, then the minimum current signal amplitude $I_{in,min}$=10 $\mu V_{pp}$/800 Ω=1.25 nA, and the maximum current signal amplitude $I_{in,max}$=20 $V_{pp}$/800 Ω=25 mA. The minimum signal amplitude output by the logarithmic amplifier 240 is calculated by $log_{10}$(1.25 nA/1 nA)=97 mV, and the maximum signal amplitude output by the logarithmic amplifier 240 is calculated by $log_{10}$(25 mA/1 nA)=7.4 V. Thus, the dynamic range requirement at the output of the logarithmic amplifier 240 is calculated to be 20 $log_{10}$(7.4 $V_{pp}$/97 m$V_{pp}$)=37.6 dB.

The number of bits N needed for the ADC 260 to measure signals having a 38 dB dynamic range may be calculated using equation (3) below as follows:

$$20*log_{10}(2^N)=38\ dB.\qquad(3)$$

Thus, N equals 6.3 bits which rounds up to 7 bits. To ensure that the 7 bits are noise-free, it may be desirable to use at least a 14-bit ADC, which is conventionally considered to be a low resolution ADC, and less than the 28-bit ADC required for digitizing signals that have not been compressed with using a logarithmic amplifier, as in system 100 of FIG. 1.

The filtered signal output from the anti-aliasing filter 250 is digitized by the ADC 260 and sent to the microprocessor 270 for further processing. Further processing can include, but is not limited to, recovering or decompressing the digitized signal, averaging and windowing operations, digital integration if the input signal came from an accelerometer, and performing fast Fourier transforms (FFTs) to determine the spectral components of the input signal.

In system 200, the logarithmic amplifier 240 replaces the attenuator 130 and gain amplifier 140 stages of the system 100. Because a single logarithmic amplifier 240 replaces the one or more attenuator 130 and/or gain amplifier 140 stages, the footprint of the system 200 is reduced as compared to the conventional system 100. Moreover, analog switches, not shown in FIG. 1, that are used for switching between different gain amplification stages 140 and software control circuitry (also not shown in FIG. 1) for controlling the switching between gain amplifiers are eliminated in the system 200. Further, each of the attenuator 130 and gain stages 140 in the conventional system 100 must be calibrated both initially and on a regular basis to insure accuracy. The system 200 also eliminates the time and instrumentation needed for this calibration.

Figure 3:
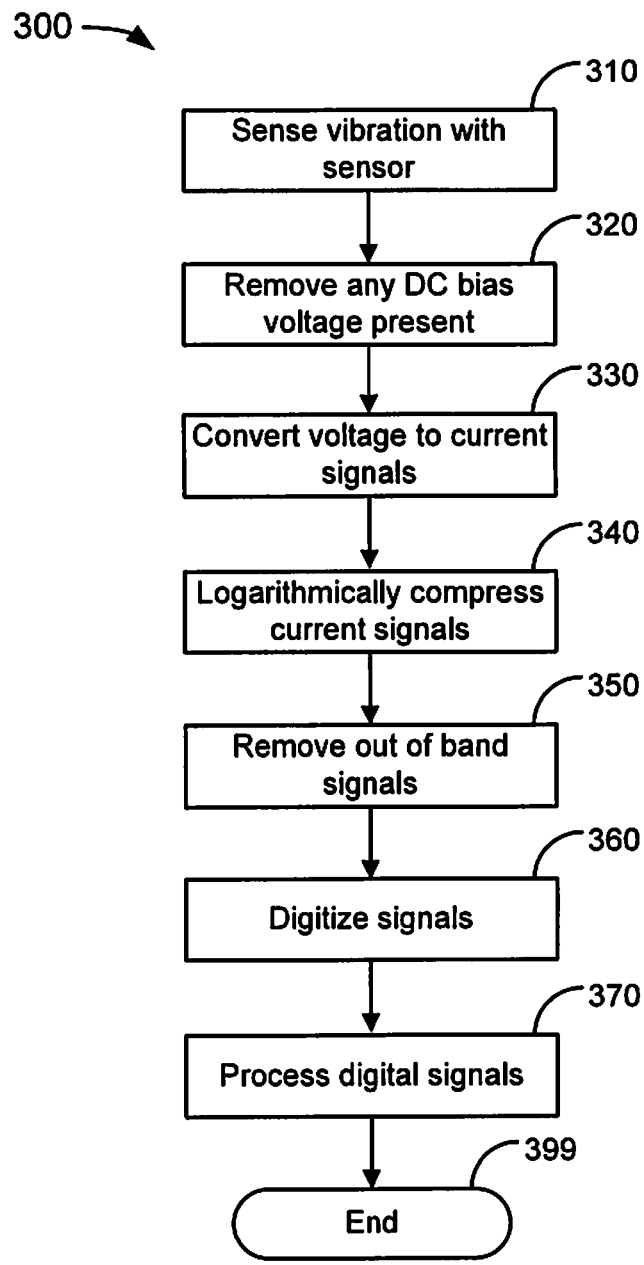
FIG. 3 is a flow diagram illustrating an exemplary process of processing a wide dynamic range signal obtained from vibration analysis using a logarithmic amplifier, according to an embodiment of the disclosure.

FIG. 3 is a flow diagram 300 illustrating an exemplary process according to an embodiment of the disclosure for processing a wide dynamic range signal obtained from vibration analysis using a logarithmic amplifier, according to an embodiment of the disclosure.

At block 310, vibrations are sensed using a sensor, such as an accelerometer, a velocity sensor, or a displacement sensor. The output from an accelerometer sensor typically has a DC bias voltage and an AC component or a bipolar voltage signal with a wide dynamic range.

Any DC bias voltage that is present is removed from the sensor signal at block 320 using an AC coupling/DC block. The AC coupling/DC block may include a capacitor to block the DC component of the signal while passing the AC component of the signal.

At block 330, AC voltage signals are converted to AC current signals. In one embodiment, an operational amplifier can be used with negative feedback to convert the voltage signal to a current signal. Generally, a logarithmic amplifier that accepts current signals at the input achieves better accuracy than a logarithmic amplifier that accepts voltage signals at the input. This may be because the input section of a logarithmic amplifier can have an operational amplifier that contains a transistor in the feedback loop. The logarithmic behavior of the system arises due to the collector current of the input transistor, and the behavior of the logarithmic amplifier is characterized by equation (2) above, and it is preferable to have current signals at the input. A voltage signal input to the logarithmic amplifier may work well for voltage sources that have a lower output impedance.

The AC current signal is then logarithmically compressed at block 340 such that the compressed output signal is proportional to the logarithm of the input current signal.

After the current signals have been compressed to a logarithmic scale, the high frequency components beyond the range of an ADC of the signal are removed from the input at block 350: In one embodiment, an anti-aliasing filter, such as a low-pass filter, can be used to remove the unwanted signals.

At block 360, the signal output from the anti-aliasing filter can be digitized by a low resolution ADC with a proper sampling frequency. Then at block 370, the digitized data from the ADC is sent to a processor for further processing. The process ends at block 399.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this patent application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. Reference in this specification to "one embodiment" or "an embodiment" means that a particular feature, structure, or characteristic described in connection with the embodiment is included in at least one embodiment of the disclosure. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A system for acquiring data on vibrations, comprising:
   a sensor configured to output a vibration signal in response to sensing the vibrations;
   a coupling configured to remove direct current bias voltage from the vibration signal and to output an alternating current voltage signal;
   a converter configured to convert the alternating current voltage signal to a current signal;
   a logarithmic amplifier configured to compress a dynamic range of the current signal and output an output signal;
   an anti-aliasing filter configured to attenuate signals outside an operating frequency range of the analog-to-digital converter; and
   an analog-to-digital converter configured to digitize the output signal and output a digital signal, wherein the analog-to-digital converter comprises a first analog-to-digital converter, wherein the first analog-to-digital converter has a first resolution lower than a second resolution of a second analog-to-digital converter used to convert the current signal without compression of the current signal by the logarithmic amplifier.

2. The system of claim 1 wherein the first analog-to-digital converter has a resolution of less than 14 bits.

3. The system of claim 1, further comprising a processor configured to process the digital signal.

4. The system of claim 3 wherein the processor is configured to decompress the digital signal while maintaining frequency information about the digital signal.

5. The system of claim 3 wherein the processor is configured to average and window the digital signal.

6. The system of claim 5 wherein the first analog-to-digital converter has a resolution of less than 14 bits.

7. The system of claim 3 wherein the processor is configured to perform a fast Fourier transform.

8. The system of claim 1 wherein the sensor comprises an accelerometer.

9. A vibration data acquisition system comprising:
   a vibration sensor;
   a logarithmic amplifier configured to compress a dynamic range of a signal from the vibration sensor to generate an output signal;
   an analog-to-digital converter configured to digitize the output signal and output a digital signal, wherein the analog-to-digital converter comprises a first analog-to-digital converter, wherein the first analog-to-digital converter has a first resolution lower than a second resolution of a second analog-to-digital converter used to convert the current signal without compression of the current signal by the logarithmic amplifier; and
   an anti-aliasing filter configured to attenuate signals outside an operating frequency range of the analog-to-digital converter.

10. The system of claim 9, further comprising an alternating current coupling configured to pass an alternating current voltage component in the signal from the vibration sensor and to remove a direct current bias voltage component from the signal from the vibration sensor.

11. The system of claim 9, further comprising a voltage to current converter configured to convert the signal from the vibration sensor from a voltage signal to a current signal.

12. The system of claim 11 wherein the logarithmic amplifier is configured to receive the current signal.

13. A method for acquiring data on vibration, comprising:
   sensing the vibration and generating a signal based upon the vibration;
   compressing a dynamic range of the signal;
   filtering the compressed signal to attenuate signals outside an operating frequency range of an analog-to-digital converter; and
   digitizing the compressed signal with the analog-to-digital converter, wherein the analog-to-digital converter comprises a first analog-to-digital converter, wherein the first analog-to-digital converter has a first resolution lower than a second resolution of a second analog-to-digital converter used to convert the current signal without compression of the current signal by the logarithmic amplifier.

14. The method of claim 13, further comprising removing any direct current bias voltage from the signal.

15. The method of claim 13, further comprising converting the signal from a voltage to a current.

16. The method of claim 13, further comprising processing the digitized compressed signal.

17. The method of claim 16, wherein processing comprises decompressing the digitized signal while maintaining frequency information about the digitized signal.

18. The method of claim 13, wherein processing comprises averaging and windowing the digitized signal.

19. The method of claim 13 wherein the first analog-to-digital converter has a resolution of less than 14 bits.

* * * * *

UNITED STATES PATENT AND TRADEMARK OFFICE
CERTIFICATE OF CORRECTION

PATENT NO. : 8,676,521 B2
APPLICATION NO. : 12/911452
DATED : March 18, 2014
INVENTOR(S) : V. s. s. K. Vennelakanti et al.

It is certified that error appears in the above-identified patent and that said Letters Patent is hereby corrected as shown below:

On the Title Page, item (73), Assignee, please change "Evertt" to --Everett--.

Signed and Sealed this
Thirty-first Day of March, 2015

Michelle K. Lee
*Director of the United States Patent and Trademark Office*